(12) United States Patent  (10) Patent No.: US 8,267,291 B2
Simon et al.  (45) Date of Patent: Sep. 18, 2012

(54) APPARATUS FOR CLOSING GAPS

(76) Inventors: Jeffrey Simon, Los Angeles, CA (US);
Mark Newburger, Los Angeles, CA (US)

( * ) Notice: Subject to any disclaimer, the term of this patent is extended or adjusted under 35 U.S.C. 154(b) by 1332 days.

(21) Appl. No.: 11/749,354

(22) Filed: May 16, 2007

(65) Prior Publication Data

US 2008/0283565 A1    Nov. 20, 2008

(51) Int. Cl.
*B60R 7/00* (2006.01)

(52) U.S. Cl. ........ 224/275; 224/542; 224/543; 224/544; 224/539; 297/182; 297/188.06; 296/37.8; 296/1.07; 296/63

(58) Field of Classification Search ........... 224/542, 224/543, 544, 539, 275; 296/37.8, 37.1, 296/37.15, 24.34, 1.07, 1.09, 63, 67; 297/181, 297/182, 188.06
See application file for complete search history.

(56) References Cited

U.S. PATENT DOCUMENTS

| | | | | |
|---|---|---|---|---|
| 2,571,574 A * | 10/1951 | Hicks | ............................ | 297/182 |
| 2,836,229 A * | 5/1958 | Spetner | .......................... | 297/182 |
| 4,118,812 A * | 10/1978 | Pangburn | .......................... | 5/657 |
| 4,948,195 A * | 8/1990 | Saunders | ........................ | 297/182 |
| 5,123,707 A * | 6/1992 | Wurzell | .......................... | 297/464 |
| 5,228,659 A * | 7/1993 | Potes et al. | ..................... | 248/429 |
| 5,527,091 A * | 6/1996 | Gruber | ..................... | 297/188.01 |
| 5,887,941 A * | 3/1999 | Kopinski et al. | .............. | 297/182 |
| 5,971,487 A * | 10/1999 | Passehl | .......................... | 297/464 |
| 6,022,072 A * | 2/2000 | Moyer | .......................... | 297/182 |
| 6,086,128 A * | 7/2000 | Whitehead, Sr. | .......... | 296/24.41 |
| 6,142,574 A * | 11/2000 | Alexander | ..................... | 297/464 |
| 6,352,299 B1* | 3/2002 | Ames et al. | ................. | 296/146.2 |
| 6,962,382 B2* | 11/2005 | Scarlett | ....................... | 296/24.46 |
| 7,527,314 B2* | 5/2009 | Dohan | .......................... | 296/37.8 |
| 7,758,090 B2* | 7/2010 | Gregory | ........................ | 296/1.07 |
| 8,056,970 B1* | 11/2011 | Phillips | .......................... | 297/182 |
| 8,162,189 B2* | 4/2012 | Robins | .......................... | 224/275 |
| 2005/0046266 A1 | 3/2005 | Schiebl | | |
| 2007/0241581 A1* | 10/2007 | Martin | .......................... | 296/37.8 |
| 2008/0283565 A1* | 11/2008 | Simon et al. | ................... | 224/542 |

FOREIGN PATENT DOCUMENTS

WO PCT/US2007/014696    1/2008

* cited by examiner

*Primary Examiner* — Nathan J Newhouse
*Assistant Examiner* — Peter Helvey
(74) *Attorney, Agent, or Firm* — Cislo & Thomas, LLP

(57) ABSTRACT

An apparatus for obstructing gaps present between front seats and dividing consoles of automobiles comprising an elongated member, having a pliable, malleable character, that can accommodate a wide range of automobile makes and models.

18 Claims, 5 Drawing Sheets

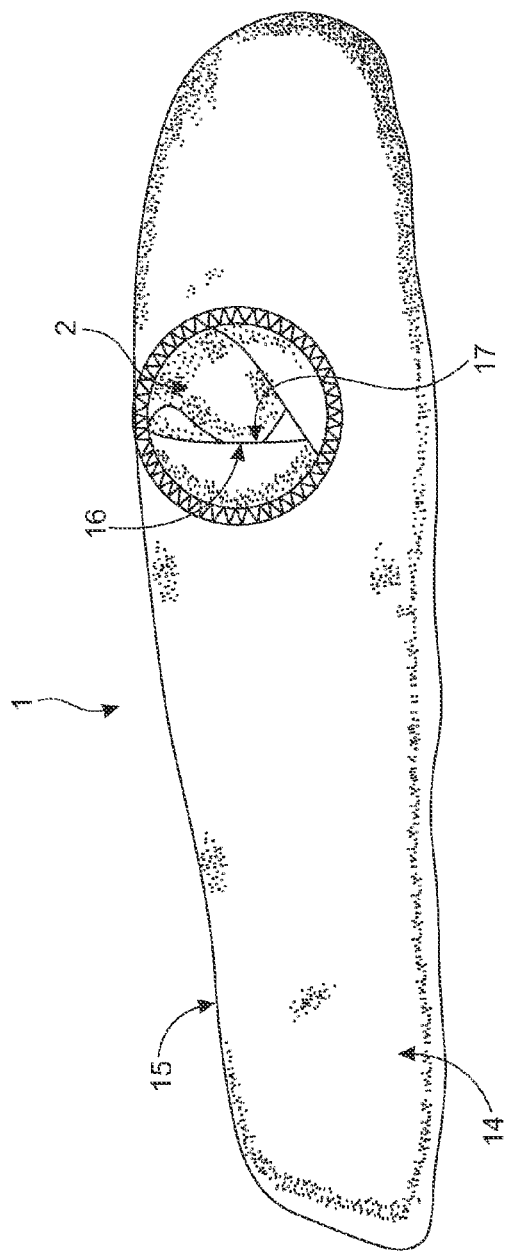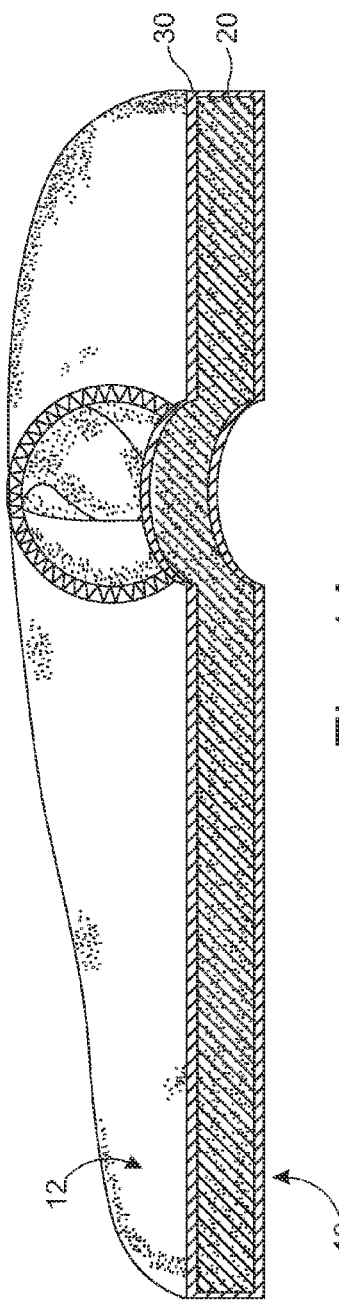

APPARATUS FOR CLOSING GAPS

BACKGROUND AND SUMMARY OF THE INVENTION

The present invention relates to an adaptable apparatus intended for obstructing gaps. In the preferred embodiment of the invention, the apparatus is used in the automobile setting. The apparatus is intended to prevent the entry of objects into gaps that are typically present between front seats of automobiles and dividing consoles.

It is common practice for drivers to perform multiple tasks, while driving. Drivers may talk on the phone, use mobile devices, operate GPS devices, eat, drink, and/or apply cosmetics while simultaneously operating a motor vehicle. While this practice poses obvious safety hazards, it is frequently done and is unlikely to discontinue, as more people are forced to spend increasing amounts of time in their automobiles.

It is also typical that while performing such extraneous tasks while operating a vehicle, objects related to such tasks will become dislodged from a driver's grasp, pocket, purse, etc. and fall into gaps or crevices located between front seats and dividing consoles. Such gaps lead to hard to reach areas located beneath or to the side of the front seats. Often times, drivers will attempt to retrieve such fallen items while driving, posing an even greater safety threat to themselves and others around them. The present invention minimizes this safety hazard by closing off any such openings or crevices, so that items cannot enter said gaps, and remain in easy reach.

The present invention also benefits users when their automobile is stationary, as it is not uncommon for individuals to drop keys or other valuable items into said gaps while a vehicle is parked. It can be irritating to retrieve valuables from such locations, especially when an individual has an appointment or is hurried. Such enclosed spaces in most automobiles are constricted and front seat components located beneath or by the side of front seats are often coated with lubricants and grease. Thus, contact with such components often soils an individual's hands, arms, or clothing while attempting to retrieve objects in areas beneath or side of front seats.

The prior art addressing the above problems is limited and possesses many shortcomings. U.S. Pat. No. 4,948,195 (hereinafter referred to as the "'195 patent") teaches an apparatus for closing gaps between front seats and consoles. The apparatus possesses an accordion-like configuration, intended to address various widths between adjacent front seats present in automobiles.

The '195 patent requires that the apparatus be constructed from plastic or cardboard. The rigid nature of the materials do not allow for the apparatus to form a snug fit between front seats and a console and cannot be securely held in position.

In addition, the apparatus taught by the '195 patent does not account for armrests that are often present between front seats, and cannot be used in automobiles that include front seat armrests. Because current automobile designs typically include front seat armrests placed above dividing consoles, the apparatus taught by the '195 patent cannot be practiced with most current automobile models.

Furthermore, the apparatus does not provide for openings for safety belt components. In order to practice the '195 apparatus, safety belt components must either be obstructed, or areas surrounding safety belt components must be exposed in order to fasten safety belts. Exposing areas surrounding safety belt components will result in gaps around said areas, defeating the purpose of the '195 apparatus.

Accordingly, it is an object of the present invention to provide an apparatus to increase driver safety and minimize driver distraction.

It is an additional object of the present invention to teach an apparatus that can accommodate a wide variety of automobile types and models.

It is a further object of the present invention to teach an apparatus that can be manufactured inexpensively.

It is another object of the present invention to teach an apparatus that can be easily and quickly practiced.

It is also an object of the present invention to teach an apparatus that can be used in a variety of settings and situations where it is desirable to block or obstruct gaps or openings.

The present invention fulfills all of the above objects and satisfies shortcomings of the prior art. The apparatus comprises a pliable, flexible elongated member that may be used to obstruct gaps in a wide variety of automobile makes and models. Practice of the present invention allows for increased driver safety and reduced driver distraction by preventing the need to retrieve lost objects in hard to reach areas while driving.

BRIEF DESCRIPTION OF DRAWINGS

FIG. 1 shows a perspective view of the preferred embodiment of the invention.

FIG. 1A shows a cross section of the preferred embodiment of the invention.

DETAILED DESCRIPTION OF PREFERRED EMBODIMENTS

Figure 2:
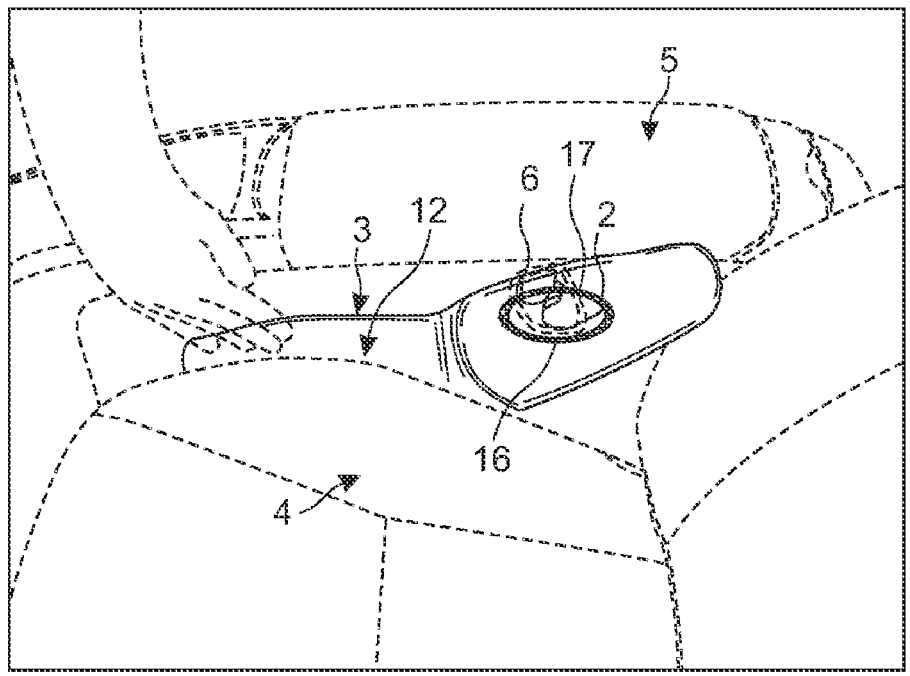
FIG. 2 shows a perspective view of the installation of the apparatus within the setting of an automobile.

Reference will now be made in detail to the preferred embodiment of the invention, examples of which are illustrated in the accompanying drawings. Wherever possible, the same reference numbers will be used throughout the illustration to refer to the same or like parts.

FIG. 1 shows a perspective view of the present invention. The invention comprises an elongated member 1 having a pliable, malleable nature. The elongated member 1 is defined by defined by a top 12, a bottom 13 opposite the top 12, a first outer wall 14, and a second outer wall 15 opposite the first outer wall 14. In the preferred embodiment, the dimensions of the apparatus approximate 18 inches in length by 4 inches in width. A slot 2 having a longitudinal length is provided toward an end region of the apparatus and defined by inner wall 16, 17. The end region 22 is the portion of the elongated member 1 adjacent to the slot 2 extending toward the back end 24 that abuts or is adjacent to the back portion of a car seat.

FIG. 1A shows a cross section of the preferred embodiment of the present invention; the apparatus comprises an internal, fiberfill of polyester or organic material 20 and an external, nylon, spandex, neoprene, or organic material casing 30. The casing may be provided in a dark color. Other materials that may be employed as the core include wool, cotton, polysterene beads, polymer gels, foam core or other pliable, supple materials. Suitable casing materials may include rayon, silk, canvas, cotton, polyester, burlap, hemp, neoprene or any other material capable of withstanding frequent manipulation and handling.

The fiberfill material employed in the preferred embodiment may be compressed with applied pressure, enabling the user to reduce the area of the apparatus for insertion in tight crevices. When applied pressure is removed, the internal material will expand towards its original dimensions, effectively sealing off areas between front seats and dividing consoles having smaller proportions than the width of the apparatus in its fully expanded state.

FIG. 2 shows a user inserting the apparatus in a gap 3 located between a lap area of a front driver seat 4 and a dividing console/armrest 5. The pliable nature of the apparatus allows it to accommodate a wide range of automobile configurations and sizes. For installation, a user simply places the apparatus in an orientation so that the slot 2 overlaps a safety belt receiving component 6 of the vehicle. Once the slot is aligned in the correct location, the user pushes the apparatus between the space for which obstruction is desired, and slides the safety belt receiving component 6 through the slot 2.

Figure 3:
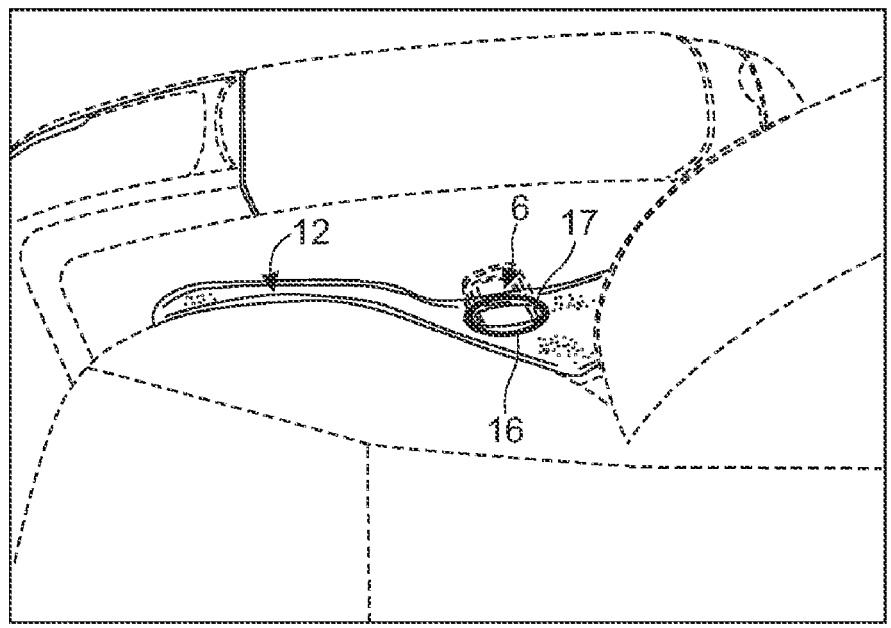
FIG. 3 shows a perspective view of the apparatus installed in a vehicle.

FIG. 3 shows the apparatus installed in a vehicle. In the preferred embodiment of the invention, the casing has a dark color. Once installed, the dark color of the preferred embodiment of the apparatus allows for a discreet and camouflaged appearance due to the natural tendency of such areas to be obstructed by shadows and/or dimly lit. The slot 2 allows for the user to fasten and unfasten his safety belt, as the receiving component 6 of the safety belt is completely unhindered by the apparatus.

Attachment of the apparatus to the receiving component of the safety belt via the slot also allows for the user to fully adjust and move the position of the seat back and forth without having to remove or re-position the apparatus. Since most receiving components of safety belts are joined to front seats, movement in the position of a front seat results in movement of the receiving component of the safety belt.

Figure 4:
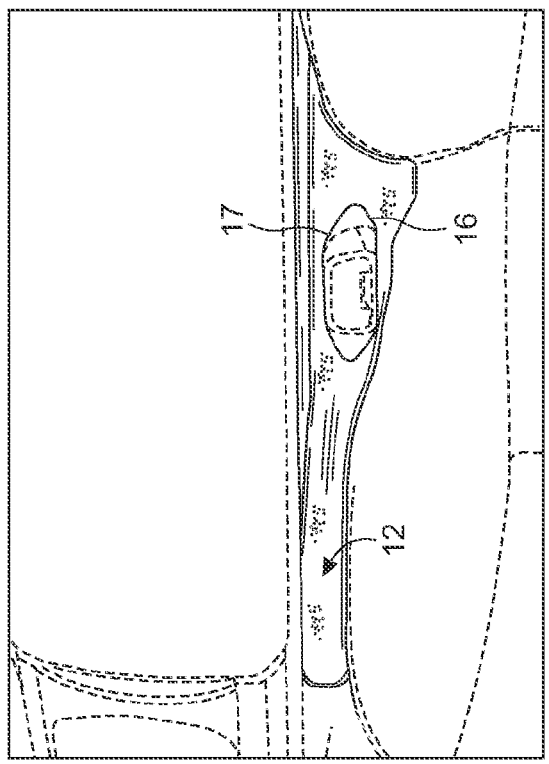
FIG. 4 shows a planar view of the apparatus installed in a vehicle.

FIG. 4 provides an additional view of the apparatus installed. The pliable nature of the apparatus allows it to fill gaps in a variety of automobile make and models. The properties of the fiberfill contained within the apparatus allows it to be compressed and inserted in gaps having smaller widths than the dimensions of the apparatus, then expand back outwards towards its original dimensions, securely closing off any gaps or crevices. The apparatus extends much of the length of the front seat, completely blocking access to hard to reach areas.

ALTERNATIVE EMBODIMENTS OF THE PRESENT INVENTION

Figure 5:
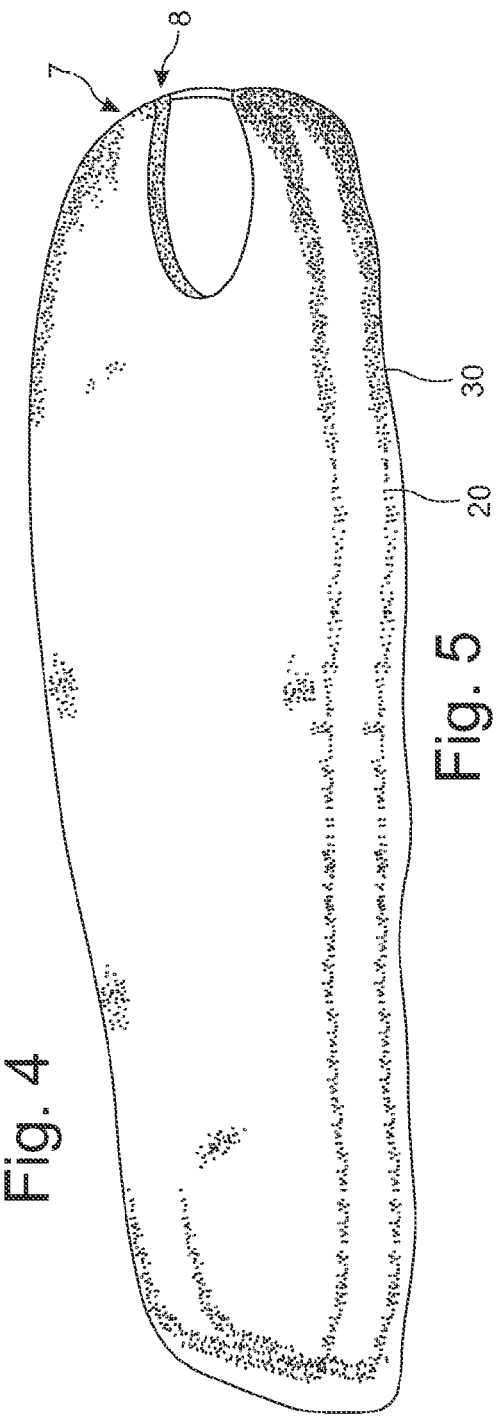
FIG. 5 shows a perspective view of a first alternative embodiment of the apparatus.

FIG. 5 depicts a first alternative embodiment wherein the materials comprising the casing 30 and core 20 are identical to those of the preferred embodiment. A terminus of the apparatus is modified however, and instead of being closed, the terminus is open-ended. The open-ended terminus forms a pronged terminus 7. Attached to each end of the prong are securing means 8 such as a hook and loop fastener (such as VELCRO®), snaps, buttons, elastic, or buckles to secure the prongs around the safety belt component. Installation is conducted in the same manner as the preferred embodiment, with the pronged terminus being positioned around a receiving component of a safety belt. When the pronged terminus surrounds the receiving component of the safety belt, the securing means located on the terminus are used to secure the apparatus around the safety belt component.

Figure 6:
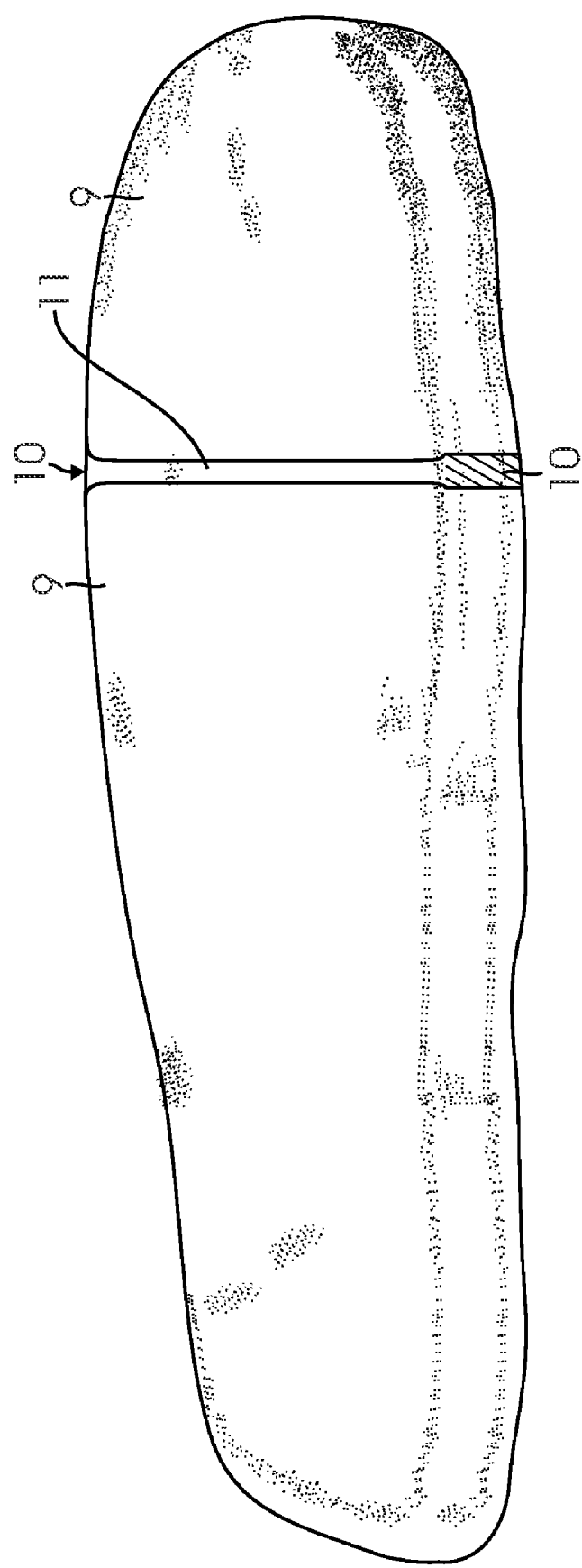
FIG. 6 shows a second alternative embodiment of the apparatus.

FIG. 6 depicts a second alternative embodiment wherein the apparatus is comprised of two elongated units 9 that are joined through flexible means 10 such as elastic. Each of the units comprises a casing and a core. The two units are constructed from the same materials for the core and casing as the preferred embodiment. Installation is accomplished by pulling said units in opposite directions, resulting in the formation of an opening 11. The resulting opening may then be placed around the receiving component of a safety belt. When the units are no longer pulled in an opposite direction, the size of the opening is reduced, allowing for a snug fit around the receiving component of the safety belt.

Figure 7:
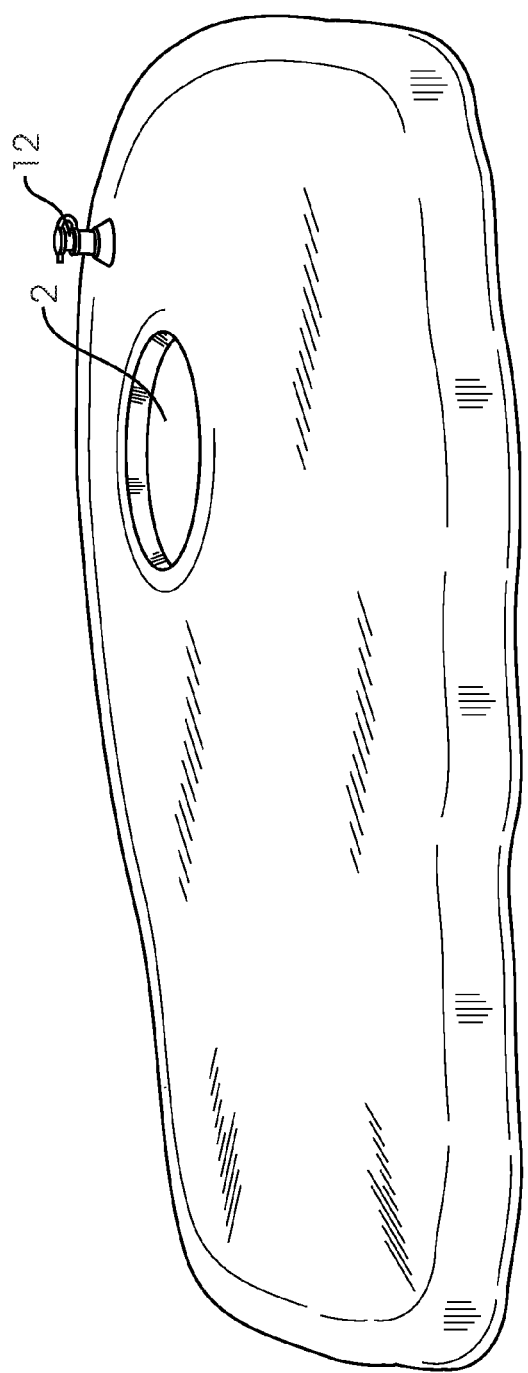
FIG. 7 shows a third alternative embodiment of the apparatus.

FIG. 7 depicts a third alternative embodiment of the present invention. In the alternative embodiment, the casing is constructed from a non-porous material such as inflatable plastic sheeting and air is used as the core material. A slot 2 is provided on the third alternative embodiment for attachment to a receiving component of a safety belt. The user may inflate the apparatus through a valve 12 and adjust pressure levels to accommodate the intended space where obstruction is desired. Installation of the third alternative embodiment is accomplished by inflating the apparatus to the desired pressure level, inserting the slot around the receiving component of the safety belt, and sliding the apparatus into position until the gap is obstructed.

Figure 8:
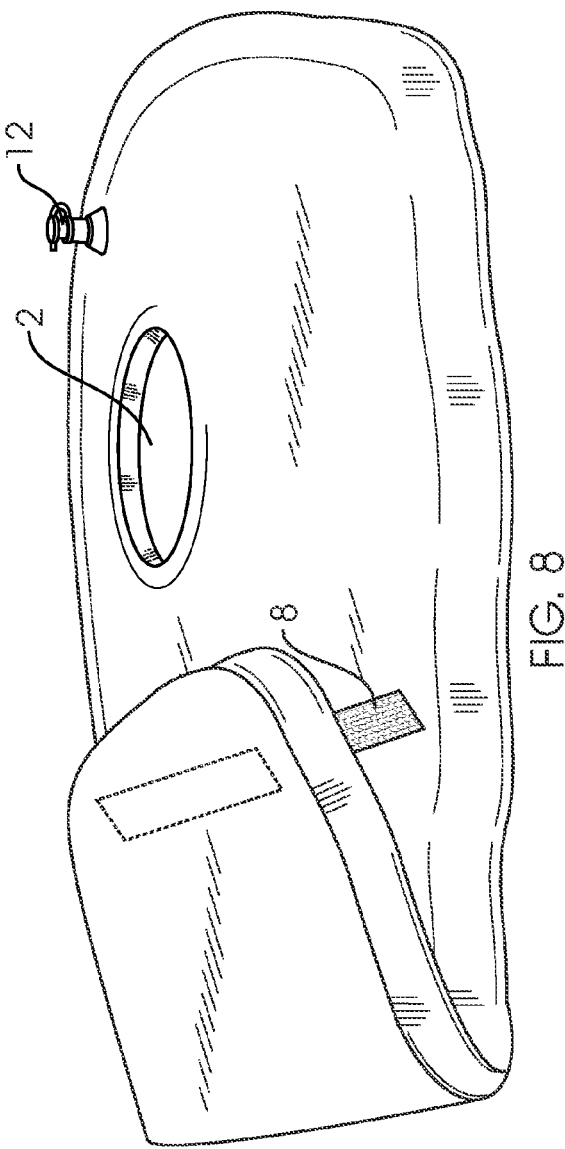
FIG. 8 shows the third alternative embodiment of the apparatus in compressed form.

FIG. 8 shows the alternative embodiment of FIG. 7 in a compact form. The length of the apparatus may be adjusted by folding the terminus remote from the slot 13. The adjusted terminus may be secured in its folded position through hook and loop fastener or other securing means 8. The alternative embodiment of the present invention allows for additional adaptability and accommodation of additional automobile configurations, makes, and models. By folding the length of the apparatus and fastening it, less inflation of the apparatus is necessary, saving installation time and avoiding unnecessary and unsightly protrusions from the apparatus.

With respect to the above description, it is to be realized that the optimum dimensional relationships for the parts of the invention, to include variations in size, materials, shape, form, function, manner, color, and use are deemed readily apparent and obvious to one skilled in the art, and all equivalent relationships to those illustrated in the drawings and described in the specification are intended to be encompassed by the present invention.

In addition, accessory features may be incorporated within the apparatus such as specialized pockets intended for storage of popular items such as MP3 players, cellular devices, or coin storage. Furthermore, a hook and loop fastener may be provided on the apparatus as well as the side of the car seat so that the apparatus is tightly attached to a front seat when said hook and loop fastener is aligned. All of these modifications may be provided on the present description as described in this specification and still remain within the spirit and scope of the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, while still falling within the spirit and scope of the invention.

What is claimed:

1. An apparatus for obstructing gaps positioned proximate a car seat in an automobile comprising:
   a. an elongated member having a casing and a core, the core being enclosed within the casing, the core having a pliable character; and
   b. a slot provided toward an end region, the slot having a longitudinal length, the slot extending through the elongated member and being encircled by the core and casing of the elongated member, and wherein the slot provides engagement to a safety belt receiving component when properly positioned adjacent the car seat to permit the elongated member to slide along a central console during longitudinal motion of the car seat, wherein the end region is longer than the longitudinal length of the slot.

2. The apparatus of claim 1, wherein the slot consists essentially of one wall.

3. The apparatus of claim 1, wherein the slot consists essentially of two walls.

4. The apparatus of claim 1, wherein the slot is generally oval in shape when engaged with the safety belt receiving component.

5. The apparatus of claim 1, wherein the slot has an open configuration when engaged with the safety belt receiving component and a partially closed configuration when disengaged from the safety belt receiving component.

6. The apparatus of claim 1, wherein the core comprises a material selected from the group consisting of fiberfill, foam, polystyrene beads, wool, cotton, polyester, organic material, and polymer gels.

7. The apparatus of claim 1 wherein the casing comprises a material selected from the group consisting of rayon, nylon, spandex, polyester, silk, canvas, burlap, cotton, neoprene, organic material, or hemp.

8. An apparatus adapted to be disposed in an automotive vehicle between a seat and a central console of the automotive vehicle, comprising:
   a. an elongated member including a casing having a top, a bottom, and a pair of opposed first and second sides, the casing enclosing a core, the first side adapted to abut the seat and the second side adapted to abut the central console, the elongated member configured to slide along the central console during longitudinal motion of the seat; and
   b. a slot encircled by the casing and the core, and extending between the bottom and top of the elongated member in a generally vertical attitude normal to both the bottom and the top and aligned longitudinally when placed in the vehicle and adapted to receive a seatbelt component having one end anchored to a side of the seat, wherein the slot provides engagement to the seatbelt component when properly positioned adjacent the car seat to permit the elongated member to slide along the central console during longitudinal motion of the seat, wherein the slot is generally oval in shape when engaged with the seatbelt component.

9. The apparatus of claim 8, wherein the slot consists essentially of one wall.

10. The apparatus of claim 8, wherein the slot consists essentially of two walls.

11. The apparatus of claim 8, wherein the slot has an open configuration when engaged with the safety belt and a partially closed configuration when disengaged from the seatbelt component.

12. The apparatus of claim 8, wherein the core comprises a material selected from the group consisting of fiberfill, foam, polystyrene beads, wool, cotton, polyester, organic material, and polymer gels.

13. The apparatus of claim 8, wherein the casing comprises rayon, nylon, spandex, polyester, silk, canvas, burlap, cotton, neoprene, organic material, or hemp.

14. An apparatus for use in an automotive vehicle having a central console extending alongside a seat, comprising:
   a. an elongated member including a casing of a first material enclosing a core of a second material having a first portion adapted to be pressed against the central console positioned adjacent to the seat, and a second portion adapted to be pressed against the seat when the elongated member is positioned in a gap defined between the central console and the seat; and
   b. a slot extending through the casing and the core of the elongated member, and adapted to receive a safety belt receiving component having a first end coupled to the seat and a second free end, wherein the slot is configured to allow the free end of the safety belt receiving component to pass through the slot and wherein the slot is conformable around the safety belt receiving component, and wherein the slot provides engagement to the safety belt receiving component when properly positioned adjacent to the seat, wherein the slot has an open configuration when engaged with the safety belt receiving component and a partially closed configuration when disengaged from the safety belt receiving component.

15. The apparatus of claim 14, wherein the slot consists essentially of one wall.

16. The apparatus of claim 14, wherein the slot consists essentially of two walls.

17. The apparatus of claim 14, wherein the core comprises a material selected from the group consisting of fiberfill, foam, polystyrene beads, wool, cotton, polyester, organic material, and polymer gels.

18. The apparatus of claim 14, wherein the casing comprises rayon, nylon, spandex, polyester, silk, canvas, burlap, cotton, neoprene, organic material, or hemp.

* * * * *

UNITED STATES PATENT AND TRADEMARK OFFICE
CERTIFICATE OF CORRECTION

PATENT NO. : 8,267,291 B2  
APPLICATION NO. : 11/749354  
DATED : September 18, 2012  
INVENTOR(S) : Jeffrey Simon et al.

Page 1 of 1

It is certified that error appears in the above-identified patent and that said Letters Patent is hereby corrected as shown below:

On the Title page, one of the inventor's names has been misspelled.
Therefore, "(76) Jeffrey Simon, Los Angeles, CA (US);
Mark Newburger, Los Angeles, CA (US)", should read -- (76) Jeffrey Simon, Los Angeles, CA (US);
Marc Newburger, Los Angeles, CA (US) --

Signed and Sealed this
Fourth Day of December, 2012

David J. Kappos
*Director of the United States Patent and Trademark Office*